United States Patent
Atarashi et al.

[11] Patent Number: 6,025,421
[45] Date of Patent: Feb. 15, 2000

[54] FLAME-RETARDANT THERMOPLASTIC RESIN COMPOSITION HAVING IMPROVED HUMIDITY RESISTANCE AND HEAT RESISTANCE

[75] Inventors: Yasunori Atarashi; Hiroyuki Tanaka, both of Kawasaki, Japan

[73] Assignee: Ajinomoto Co., Inc., Tokyo, Japan

[21] Appl. No.: 08/998,706

[22] Filed: Dec. 29, 1997

[30] Foreign Application Priority Data

Dec. 27, 1996 [JP] Japan ..................... 8-349768

[51] Int. Cl.$^7$ ....................................... C08K 5/51
[52] U.S. Cl. .................. 524/151; 523/202; 523/205; 523/209
[58] Field of Search ............. 524/151; 523/202, 523/205, 209

[56] References Cited

U.S. PATENT DOCUMENTS 4,115,351  9/1978  Joh ........................... 523/202
4,439,572  3/1984  Kindrick ..................... 523/205

*Primary Examiner*—Edward J. Cain
*Attorney, Agent, or Firm*—Oblon, Spivak, McClelland, Maier & Neustadt, P.C.

[57] ABSTRACT

A flame-retardant thermoplastic resin composition, comprising 100 parts by weight of a thermoplastic resin, from about 5 to 100 parts by weight of an inorganic filler surface-treated with a phosphate represented by the following formula (A) and from about 5 to 50 parts by weight of an aromatic orthophosphate.

(A)

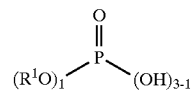

wherein $R^1$ represents an organic group having at least one ethylenic double bond capable of radical polymerization and containing from about 5 to 60 carbon atoms, and l is 1 or 2.

8 Claims, No Drawings

FLAME-RETARDANT THERMOPLASTIC RESIN COMPOSITION HAVING IMPROVED HUMIDITY RESISTANCE AND HEAT RESISTANCE

BACKGROUND OF THE INVENTION

1. Field of the Invention

The present invention relates to a flame-retardant thermoplastic resin composition containing a surface-treated inorganic filler by which humidity- and heat-resistance are improved.

2. Description of the Background

Flame-retardancy has been conventionally imparted using various aromatic orthophosphates as a flame-retardant in a thermoplastic resin. It is also well known that a variety of inorganic fillers can be added as a reinforcing agent and an extender of the resin composition, as required.

However, when an aromatic orthophosphate is used as a flame-retardant and inorganic fillers are used as a reinforcing agent and an extender in a thermoplastic resin, the properties of these additives are generally satisfactory immediately after their addition, except that humidity resistance and heat resistance are greatly decreased.

In order to solve these problems, for example, an aromatic orthophosphate having a good humidity resistance and a good heat resistance may be selected, and humidity resistance and heat resistance can be improved by surface-treating an inorganic filler using various surface treating agents, as reported in Japanese Patent Publication No. 18,336/1990 and a Japanese Patent Application Laid-Open (Kokai) No. 36,630/1989.

As the above-mentioned surface treating agent of the inorganic filler, an aliphatic acid compound, a silane compound, a titanate compound and a phosphorus compound are known. However, the aliphatic acid compound exhibits a low surface treatment effect to the inorganic filler. In order to retain a high surface treatment effect, a large amount of the surface treating agent is required, with the result that the properties of the blend are disadvantageously compromised. Moreover, the silane compound which is a surface treating agent has, itself, poor hydrolysis resistance. Therefore, the properties are notably decreased when conducting the test for humidity resistance. Further, the titanate compound, is, itself, discolored. Accordingly, a composition containing an inorganic filler treated with this compound is discolored.

With respect to the phosphorus compound, it is reported in Japanese Patent Application Laid-Open (Kokai) No. 36,630/1989, that humidity resistance can be improved using a dialkyl phosphate or a monoalkyl phosphate. In this case, however, humidity resistance and heat resistance of a thermoplastic resin composition containing an inorganic filler obtained through surface-treatment with the phosphorus compound could not be satisfied. Further, an unsaturated alkyl phosphoric acid diester or monoester is reported in Japanese Patent Publication No. 58,173/1988. Nevertheless, observed flame-retardancy is inadequate, and when an organic filler is used in a large amount to impart flame-retardancy, properties of a blend are decreased.

SUMMARY OF THE INVENTION

It is an object of the present invention to provide a flame-retardant thermoplastic resin composition containing a thermoplastic resin which is excellent in humidity resistance and heat resistance, an aromatic orthophosphate and a surface-treated inorganic filler.

DETAILED DESCRIPTION OF THE PREFERRED EMBODIMENTS

In accordance with the present invention, it has been surprisingly discovered that a fire-retardant thermoplastic resin composition which is excellent in humidity resistance and heat resistance is obtained by surface-treating an inorganic filler with a specific phosphate. The present invention is predicated, at lest in part, by this discovery.

Thus, the present invention relates to a flame-retardant thermoplastic resin composition comprising 100 parts by weight of a thermoplastic resin, from 5 to 100 parts by weight of an inorganic filler surface-treated with a phosphate represented by the following formula (A) and from 5 to 50 parts by weight of an aromatic orthophosphate.

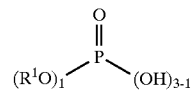

(A)

wherein $R^1$ represents an organic group having at least one ethylenic double bond capable of radical polymerization and containing from about 5 to 60 carbon atoms, and l is 1 or 2.

In the present invention, when the amount of the phosphate represented by the formula (A) is between 0.01 and 10 parts by weight per 100 parts by weight of the inorganic filler, excellent effects are provided. Further, when the phosphate represented by the formula (A) is a phosphate represented by the following formula (B), excellent effects are also provided.

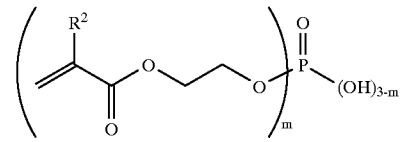

(B)

wherein $R^2$ represents H or $CH_3$, and m is 1 or 2.

Examples of the thermoplastic resin used in the present invention may include an ABS resin, a styrene resin, a polyvinyl chloride resin, a polyethylene resin, a polypropylene resin, polyethylene terephthalate resin, a polybutylene terephthalate resin, a polycarbonate resin, a polyphenylene ether resin, a modified polyphenylene ether resin, a polyamide resin, a polysulfone resin, a polyvinyl acetate resin and a polyacetal resin. These resins may be used either singly or in combination as required.

The aromatic orthophosphate refers to a triaryl phosphate, and acts as a flame-retardant in the present invention. Specific examples thereof include monomeric aromatic orthophosphates such as triphenyl phosphate, tricresyl phosphate, cresyldiphenyl phosphate, trixylenyl phosphate, xylenyldiphenyl phosphate, tris(t-butyl) phosphate and tris-(isopropylphenyl)phosphate; and a condensed aromatic orthophosphates such as resorcinol bis(diphenyl phosphate), resorcinol bis(dicresyl phosphate), bisphenol-A bis(dicresyl phosphate) and bisphenol-A bis(dixylenyl phosphate). However, these examples are not limited. These aromatic orthophosphates may be used either singly or in combination as required.

The amount of the above-mentioned aromatic orthophosphate is appropriately between about 5 and 50 parts by weight of the thermoplastic resin. When the amount of the aromatic orthophosphate is less than 5 parts by weight, the desired flame-retardancy cannot be imparted to the resulting thermoplastic resin composition. When the amount of the orthophosphate exceeds 50 parts by weight, the aromatic orthophosphate is bled out from the blend.

The phosphate in the inorganic filler surface-treated with the phosphate represented by the formula (A), which is used in the present invention, is an acidic phosphate compound which contains an organic group having at least one ethylenic double bond capable of radical polymerization and containing from 5 to 60 carbon atoms in the side chain. This phosphate compound is a compound illustrated in Japanese Patent Application Laid-Open (Kokai) No. 28,204/1990. Specific examples of the compound represented by the formula (B) include mono(2-methacryloyloxyethyl)acid phosphate, di(2-methacryloyloxyethyl)acid phosphate, mono(2-acryloyloxyethyl)acid phosphate, and di(2-acryloyloxyethyl)acid phosphate.

When the inorganic filler is surface-treated with the phosphate, the above-mentioned phosphates may be used either singly or in combination as required. Further, a monoalkyl phosphate or dialkyl phosphate represented by the following general formula (C), or a mixture thereof may be jointly used at a desired ratio as required unless a humidity resistance and a heat resistance of a blend are decreased. Still further, the other known surface treating agent such as an aliphatic acid compound, a silane compound or a titanate compound may be jointly used as required unless a humidity resistance and a heat resistance blend are decreased. Formula (C) is:

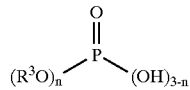

(C)

wherein $R^3$ represents a linear or branched saturated hydrocarbon group containing from 1 to 30 carbon atoms, and n is 1 or 2.

Examples of the inorganic filler surface-treated with the phosphate represented by the general formula (A), which is used in the present invention, include metal oxides such as aluminum oxide, titanium oxide, and antimony trioxide; metal carbonates such as calcium carbonate and barium carbonate; metal hydroxides such as aluminum hydroxide and magnesium hydroxide; and metal sulfates such as calcium sulfate and barium sulfate. Further, talc, kaolin, clay, silica, bentonite, glass, mica, moutmorillonite, bentoniate, activated clay, carbon black and calcium titanate are also available. However, these are not critical. The form of these inorganic fillers is not particularly limited, and it includes all forms such as powder, particles, a bar, a sheet, a cotton, a bulk and the like. These inorganic fillers may be used either singly or in combination as required.

A method of surface-treating an inorganic filler using the phosphate represented by the general formula (A) in the present invention includes 1) a method in which the surface-treating agent is directly added to the inorganic filler, and the mixture is co-pulverized using a pulverization device such as a Henschel mixer, a ball mill, an atomizer or a colloid mill, 2) a method in which the surface-treating agent is added to an appropriate organic solvent such as toluene, xylene, benzene, hexane, cyclohexane, methyl ethyl ketone, acetone, acetonitrile, carbon tetrachloride, chloroform, methylene chloride, trichloroethylene, diethyl ether or tetrahydrofuran along with an inorganic filler, the mixture is stirred and mixed, and the solvent is then removed, and 3) a method in which the surface treating agent is directly added to a mixture of a thermoplastic resin and an inorganic filler or to a mixture of a thermoplastic resin, an aromatic orthophosphate and an inorganic filler, and these are mixed using a monoaxial kneader, a biaxial kneader, a Banbury mixer or a hot roll.

In the present invention, the amount of the surface-treating agent used when the inorganic filler is surface-treated with the phosphate represented by the formula (A) is preferably between about 0.01 and 10 parts by weight per 100 parts by weight of the inorganic filler used. When the amount of the surface-treated, with the result that the humidity resistance and the heat resistance in the tests for these properties are notably decreased. When the amount of the surface-treating agent exceeds 10 parts, the surface-treating agent is bled out from the blend.

The amount of the inorganic filler treated with the phosphate represented by the general formula (A) is appropriately between 5 and 100 parts by weight per 100 parts by weight of the thermoplastic resin. When the amount of the inorganic filler is less than 5 parts by weight, the desired reinforcing effect and filling effect provided by the addition of the inorganic filler are not obtained. When the amount of the inorganic filler exceeds 100 parts by weight, the properties of the blend are decreased.

Further, the flame-retarded thermoplastic resin composition of the present invention can contain, as required, a stabilizer, a pigment, a plasticizer, a lubricant, a foam stabilizer, a blowing agent and the other flame-retardant which are ordinarily used as additives of various resins unless a humidity resistance and a heat resistance of a composition which are characteristics of the present invention are impaired.

The inorganic filler surface-treated with the abovementioned surface treating agent, the thermoplastic resin and the aromatic orthophosphate in the present invention can be kneaded in a known manner using a monoaxial kneader, a biaxial kneader, a Banbury mixer, a hot roll or the like.

The flame-retarded thermoplastic resin composition of the present invention is especially useful in the field of, for example, electric and electronic parts, building materials and the like requiring a high humidity resistance and a heat resistance. However, these are not critical.

The present invention will now be further illustrated by the reference to certain Examples and Comparative Examples, which are provided solely for the purposes of illustration and are not intended to be limitative.

EXAMPLE 1

(2-Methacyloyloxyethyl)acid phosphate (0.5 parts, Light Ester PM, made by Kyoeisha Chemical Co., Ltd.) was added to 200 parts of toluene. This solution was mixed with 100 parts of short fiber glasses (RES 015-TR70, made by Nippon Sheet Glass Co., Ltd.) which had been heat-cleaned at 650° C. The mixture was stirred at room temperature for 10 minutes, and toluene was distilled off at 60° C. under reduced pressure to form a treated powder (hereinafter referred to as a "treated powder A").

EXAMPLE 2

Example 1 was repeated except that 0.5 parts of (2-acryloyloxyethyl)acid phosphate (Light Ester PA, made by Kyoeisha Chemical Co., Ltd.) were used as a phosphate in the surface treatment to form a treated powder (hereinafter referred to as "treated powder B").

EXAMPLE 3

Example 1 was repeated except that 0.4 parts of (2-methacryloyloxyethyl)acid phosphate (Light Ester PM, made by Kyoeisha Chemical Co., Ltd.) and 0.1 parts of 2-ethylhexyl phosphate (Phoslex A-8, made by Sakai Chemical Industry Co., Ltd.) were used as a phosphate treatment in the surface treatment to form a treated powder (hereinafter referred to as a "treated powder C").

COMPARATIVE EXAMPLE 1

Example 1 was repeated except that 0.5 parts of 2-ethylhexyl phosphate (Phoslex A-8, made by Sakai Chemical Industry Co., Ltd.) were used as a phosphate in the surface treatment to form a treated powder (hereinafter referred t as a "treated powder D").

COMPARATIVE EXAMPLE 2

Example 1 was repeated except that 0.001 parts of(2-methacryloyloxyethyl)acid phosphate (Light Ester PM, made by Kyoeisha Chemical Co., Ltd.) were used as a phosphate in the surface treatment to form a treated powder (hereinafter referred to as a "treated powder E").

COMPARATIVE EXAMPLE 3

Example 1 was repeated except that 15 parts of (2-methacryloyloxyethyl)acid phosphate (Light Ester PM, made by Kyoeisha Chemical Co., Ltd.) were used as a phosphate in the surface treatment to form a treated powder (hereinafter referred to as a "treated powder F").

EXAMPLE 4

(2-Methacyloyloxyethyl)acid phosphate (0.5 parts, Light Ester PM, made by Kyoeisha Chemical Co., Ltd.) was added to 200 parts of toluene. This solution was mixed with 100 parts of talc (High Filler #50000PJ, made by Matsumura Sangyo Co., Ltd.) as an inorganic filler. The mixture was stirred at room temperature for 10 minutes, and toluene was distilled off at 60° C. to form a treated powder (hereinafter referred to as a "treated powder G").

EXAMPLE 5

Example 4 was repeated except that 0.5 parts of (2-acryloyloxyethyl)acid phosphate (Light Ester PA, made by Kyoeisha Chemical Co., Ltd.) were used as a phosphate in the surface treatment and 100 parts of talc (High Filler #5000PJ made by Matsumura Sangyo Co., Ltd.) as an inorganic filler to form a treated powder (hereinafter referred to as a "treated filler H").

EXAMPLE 6

Example 4 was repeated except that 0.4 parts of (2-acryloyloxyethyl)acid phosphate (Light Ester PA, made by Kyoeisha Chemical Co., Ltd.) and 0.1 parts of 2-ethylhexyl phosphate (Phoslex A-8, made by Sakai Chemical Industry Co., Ltd.) were used as a phosphate in the surface treatment and 100 parts of talc (High Filler #5000PJ made by Matsumura Sangyo Co., Ltd.) as an inorganic filler to form a treated powder (hereinafter referred to as a "treated filler I").

COMPARATIVE EXAMPLE 4

Example 4 was repeated except that 0.5 parts of 2-ethylhexyl phosphate (Phoslex A-8, made by Sakai Chemical Industry Co., Ltd.) were used as a phosphate in the surface treatment and 100 parts of talc (High Filler #5000PJ made by Matsumura Sangyo Co., Ltd.) as an inorganic filler to form a treated powder (hereinafter referred to as a "treated filler J").

EXAMPLE 7

One-hundred parts of a polycarbonate resin (LEXAN 141-111, made by G.E. Plastics Japan Ltd.) which had been preliminarily dried at 110 C for 5 hours were kneaded with 10 parts of triphenyl phosphate (Reofos TPP, made by Ajinomoto Co., Inc.) as an aromatic orthophosphate and 10 parts of the treated powder A obtained in Example 1 at 240 C using a biaxial kneader (2D20S Model, supplied by Toyo Seiki Seisakusho K.K.), and the mixture was then pelletized using a pelletizer (MCI, supplied by Toyo Seiki Seisakusho K.K.). The resulting pellets were formed into test pieces of ASTM D-638 No. 1, test pieces of JIS K 7110 No. 2 (A notch) and ⅛-inch UL-94 test pieces. The appearance of the test pieces (test pieces of ASTM D-638 No. 1) was visually observed. The tensile strength (yield value) and the Izod impact strength were measured according to ASTM D-638 and ASTM D-256. Further, the flame-retardancy of the test pieces formed was measured using a UL-94 measuring device (UL-94 V Model, supplied by Suga Test Instruments Co., Ltd.). Subsequently, the tensile strength, the impact strength and the flame-retardancy were likewise measured at a temperature of 121 C and humidity of RH 100 with a constant-temperature and constant-humidity tester (ETAC PM422 Model, supplied by Kusumoto Chemicals Ltd.) after 50 hours using the above-mentioned ASTM D-638 No. 1 test pieces, JIS K 7110 No. 2 test pieces (A notch) and ⅛-inch UL-94 test pieces.

EXAMPLE 8

Example 7 was repeated except that resorcinol bis (diphenyl phosphate (Reofos RDP, made by Ajinomoto Co., Inc.) was used as an aromatic orthophosphate.

EXAMPLE 9

Example 7 was repeated except that bisphenol A bis (dicresyl phosphate) (Phosflex 580, made by Akzo Nobel K.K.) was used as an aromatic orthophosphate.

EXAMPLE 10

Example 8 was repeated except that the powder B obtained in Example 2 was used as a filler.

EXAMPLE 11

Example 8 was repeated except that the powder C obtained in Example 3 was used as a filler.

COMPARATIVE EXAMPLE 5

Example 8 was repeated except that the treated powder D obtained in Comparative Example 1 was used as a filler.

COMPARATIVE EXAMPLE 6

Example 8 was repeated except that the treated powder E obtained in Comparative Example 2 was used as a filler.

COMPARATIVE EXAMPLE 7

Example 8 was repeated except that the treated powder F obtained in Comparative Example 3 was used as a filler.

COMPARATIVE EXAMPLE 8

Example 8 was repeated except that an untreated powder of short fiber glasses (RES 015-TP70, made by Nippon Sheet Glass Co., Ltd.) which had been heat-cleaned at 650 C was used as a filler.

The results in Examples 7 to 11 and Comparative Examples 5 to 8 are shown in Table 1.

TABLE 1

| | Ex. 7 | Ex. 8 | Ex. 9 | Ex. 10 | Ex. 11 |
|---|---|---|---|---|---|
| <Formulation> | | | | | |
| PC resin* | 100 | 100 | 100 | 100 | 100 |
| Aromatic orthophosphate** | 10 (TPP) | 10 (RDP) | 10 (F-580) | 10 (RDP) | 10 (RDP) |
| Inorganic filler | 10 (powder A) | 10 (powder A) | 10 (powder A) | 10 (powder B) | 10 (powder C) |
| <Properties> | | | | | |
| Appearance (visual observation)*** | | | | | |
| before tests for humidity resistance and heat resistance | ○ | ○ | ○ | ○ | ○ |
| after tests for humidity resistance and heat resistance | Δ | Δ | Δ | Δ | Δ |
| Tensile strength (yield value, kg/cm²) | | | | | |
| before tests for humidity resistance and heat resistance | 721 | 766 | 774 | 761 | 755 |
| after tests for humidity resistance and heat resistance | 614 | 659 | 680 | 648 | 635 |
| Izod impact strength (kg cm/cm) | | | | | |
| before tests for humidity resistance and heat resistance | 13.5 | 12.2 | 11.8 | 12.0 | 12.5 |
| after tests for humidity resistance and heat resistance | 10.6 | 10.1 | 10.2 | 10.0 | 9.8 |
| Flame-retardancy (UL-94) | | | | | |
| before tests for humidity resistance and heat resistance | V–0 | V–0 | V–0 | V–0 | V–0 |
| after tests for humidity resistance and heat resistance | V–1 | V–1 | V–1 | V–1 | V–1 |

| | CEx. 5 | CEx. 6 | CEx. 7 | CEx. 8 |
|---|---|---|---|---|
| <Formulation> | | | | |
| PC resin* | 100 | 100 | 100 | 100 |
| Aromatic orthophosphate** | 10 (RDP) | 10 (RDP) | 10 (RDP) | 10 (RDP) |
| Inorganic filler | 10 (powder D) | 10 (powder E) | 10 (powder F) | 10 (untreated) |
| <Properties> | | | | |
| Appearance (visual observation)*** | | | | |
| before tests for humidity resistance and heat resistance | ○ | ○ | ○ | ○ |
| after tests for humidity resistance and heat resistance | X | X | X | X |
| Tensile strength (yield value, kg/cm²) | | | | |
| before tests for humidity resistance and heat resistance | 711 | 714 | 730 | 690 |
| after tests for humidity resistance and heat resistance | 516 | 554 | 514 | 482 |
| Izod impact strength (kg cm/cm) | | | | |
| before tests for humidity resistance and heat resistance | 11.1 | 11.2 | 13.0 | 10.2 |
| after tests for humidity resistance and heat resistance | 7.9 | 7.9 | 8.9 | 6.5 |
| Flame-retardancy (UL-94) | | | | |
| before tests for humidity resistance and heat resistance | V–0 | V–0 | V–0 | V–0 |
| after tests for humidity resistance and heat resistance | V–2 | V–2 | V–2 | V–2 |

Ex. - Example, CEx. - Comparative Example
*LEXAN 141-111, made by G.E. Plastics Japan Ltd. was used as a polycarbonate resin.
**TPP "Reofos TPP", made by Ajinomoto Co., Inc., RDP "Reofos RDP", made by Ajinomoto Co., Inc., and F-580 "Phosflex 580", made by Akzo Nobel K.K.
***Visual observation:
○: No bleeding was observed on the surface of the molded article.
Δ: Bleeding slightly occurred.
X: Bleeding drastically occurred.

EXAMPLE 12

Example 8 was repeated except that the treated powder G obtained in Example 4 was used as a filter.

EXAMPLE 13

Example 8 was repeated except that the treated powder H obtained in Example 5 was used as filler.

EXAMPLE 14

Example 8 was repeated except that the treated powder I obtained in Example 6 was used as a filler.

COMPARATIVE EXAMPLE 9

Example 8 was repeated except that the treated powder J obtained in Comparative Example 4 was used as a filler.

The results in Examples 12 to 14 and Comparative Example 9 are shown in Table 2.

TABLE 2

| | Ex. 12 | Ex. 13 | Ex. 14 | CEx. 9 |
|---|---|---|---|---|
| <Formulation> | | | | |
| PC resin* | 100 | 100 | 100 | 100 |
| Aromatic orthophosphate** | 10 (RDP) | 10 (RDP) | 10 (RDP) | 10 (RDP) |
| Inorganic filler | 10 (powder G) | 10 (powder H) | 10 (powder I) | 10 (powder J) |
| <Properties> | | | | |
| Appearance (visual observation)*** | | | | |
| before tests for humidity resistance and heat resistance | ○ | ○ | ○ | ○ |

TABLE 2-continued

|  | Ex. 12 | Ex. 13 | Ex. 14 | CEx. 9 |
|---|---|---|---|---|
| after tests for humidity resistance and heat resistance | Δ | Δ | Δ | X |
| Tensile strength (yield value, kg/cm$^2$) | | | | |
| before tests for humidity resistance and heat resistance | 718 | 710 | 714 | 692 |
| after tests for humidity resistance and heat resistance | 594 | 586 | 581 | 514 |
| Izod impact strength (kg cm/cm) | | | | |
| before tests for humidity resistance and heat resistance | 11.9 | 11.7 | 12.1 | 11.2 |
| after tests for humidity resistance and heat resistance | 9.5 | 9.2 | 9.3 | 7.8 |
| Flame-retardancy (UL-94) | | | | |
| before tests for humidity resistance and heat resistance | V–0 | V–0 | V–0 | V–0 |
| after tests for humidity resistance and heat resistance | V–1 | V–1 | V–1 | V–2 |

*LEXAN 141-111, made by G.E. Plastics Japan Ltd. was used as a polycarbonate resin.
**RDP "Reofos RDP", made by Ajinomoto Co., Inc.
***Visual observation:
  ○: No bleeding was observed on the surface of the molded article.
  Δ: Bleeding slightly occurred.
  X: Bleeding drastically occurred.

EXAMPLE 15

One hundred parts of a modified polyphenylene ether resin (NORYL 731-701, made by G.E. Plastics Japan Ltd.) which had been preliminarily dried at 90 C for 5 hours were kneaded with 10 parts of resorcinol bis(diphenyl phosphate) (Reofos RDP, made by Ajinomoto Co., Inc.) as an aromatic orthophosphate and 10 parts of the treated powder A obtained in Example 1 at 220 C using a biaxial kneader (2D20S Model, supplied by Toyo Seiki Seisakusho K.K.). The mixture was pelletized using a pelletizer (MCI, supplied by Toyo Seiki Seisakusho K.K.). The resulting pellets were formed into ASTM D-638 No. 1 test pieces, JIS K 7110 No. 2 test pieces (A notch) and ⅛ inch UL-94 test pieces using an injection molding machine (N40-BII, supplied by The Japan Steel Works, Ltd.). The appearance of the resulting test pieces (ASTM D-638 No. 1 test pieces) was visually observed. The tensile strength (yield value) and the Izod impact strength were measured according to ASTM D-638 and ASTM D-256 respectively. Further, the flame-retardancy of the test pieces prepared was measured using a UL-94 measuring device (UL-94 V Model, supplied by Suga Test Instruments Co., Ltd.). Subsequently, the tensile strength, the impact strength and the flame-retardancy were likewise measured at a temperature of 121 C and humidity of RH 100% with a constant-temperature and constant-humidity tester (ETAC PM422 Model, supplied by Kusumoto Chemicals Ltd.) after 50 hours using the above-mentioned ASTM D-638 No. 1 test pieces, JIS K 7110 No. 2 test pieces (A notch) and ⅛-inch UL-94 test pieces.

EXAMPLE 16

Example 15 was repeated except that the treated powder B obtained in Example 2 was used as a filler.

EXAMPLE 17

Example 15 was repeated except that the treated powder C obtained in Example 3 was used as a filler.

COMPARATIVE EXAMPLE 10

Example 15 was repeated except that the treated powder D obtained in Comparative Example 1 was used as a filler.

The results in Examples 15 to 17 and Comparative Example 10 are shown in Table 3.

TABLE 3

|  | Ex. 15 | Ex. 16 | Ex. 17 | CEx. 10 |
|---|---|---|---|---|
| <Formulation> | | | | |
| M-PPE RESIN* | 100 | 100 | 100 | 100 |
| Aromatic orthophosphate** | 10 (RDP) | 10 (RDP) | 10 (RDP) | 10 (RDP) |
| Inorganic filler | 10 (powder A) | 10 (powder B) | 10 (powder C) | 10 (powder D) |
| <Properties> | | | | |
| Appearance (visual observation)*** | | | | |
| before tests for humidity resistance and heat resistance | ○ | ○ | ○ | ○ |
| after tests for humidity resistance and heat resistance | Δ | Δ | Δ | X |
| Tensile strength (yield value (kg/cm$^2$) | | | | |
| before tests for humidity resistance and heat resistance | 844 | 830 | 826 | 801 |
| after tests for humidity resistance and heat resistance | 681 | 679 | 669 | 570 |
| Izod impact strength (kg cm/cm) | | | | |
| before tests for humidity resistance and heat resistance | 10.2 | 10.4 | 10.9 | 9.6 |
| after tests for humidity resistance and heat resistance | 8.5 | 8.4 | 8.8 | 6.9 |
| Flame-retardancy (UL-94) | | | | |
| before tests for humidity resistance and heat resistance | V–0 | V–0 | V–0 | V–0 |
| after tests for humidity resistance and heat resistance | V–1 | V–1 | V–1 | V–2 |

*Noryl 731-701, made by G.E. Plastics Japan Ltd. was used as an m-PPE resin.
**RDP "Reofos RDP", made by Ajinomoto Co., Inc.
***Visual observation:
  ○: No bleeding was observed on the surface of the molded article.
  Δ: Bleeding slightly occurred.
  X: Bleeding drastically occurred.

Upon comparing Examples 7 to 11 with Comparative Examples 5 to 8 in Table 1, it was found that the molded articles in Examples 7 to 11 exhibited better properties (appearance, flame-retardancy and impact strength) after the constant-temperature and constant-humidity test than the molded articles in Comparative Examples 5 to 8.

Upon comparing Examples 12 to 14 with Comparative Example 9 in Table 2, it was found that the molded articles in Examples 12 to 14 exhibited better properties (appearance, flame-retardancy and impact strength) after the constant-temperature and constant-humidity test than the molded article in Comparative Example 9.

Upon comparing Examples 15 to 17 with Comparative Example 10 in Table 3, it was found that the molded articles in Examples 7 to 11 exhibited better properties (appearance, flame-retardancy and impact strength) after the constant-temperature and constant-humidity test than the molded articles in Comparative Example 10.

Having described the present invention, it will now be apparent that many changes and modifications may be made to the above-described embodiments without departing from the spirit and the scope of the present invention.

What is claimed as new and is desired to be secured by Letters Patent of the Unites States is:

1. A flame-retardant thermoplastic resin composition, comprising about 100 parts by weight of a thermoplastic resin, from about 5 to 100 parts by weight of an inorganic filler surface-treated with a phosphate represented by the following formula (A) and from about 5 to 50 parts by weight of an aromatic orthophosphate.

(A)

wherein $R^1$ represents an organic group having at least one ethylenic double bond capable of radical polymerization and containing from about 5 to 60 carbon atoms, and l is 1 or 2.

2. The flame-retardant thermoplastic resin composition of claim 1, wherein the amount of the phosphate represented by the formula (A) is between about 0.01 and 10 parts by weight per 100 parts by weight of the inorganic filler.

3. The flame-retardant thermoplastic resin composition of claim 1, wherein the phosphate represented by the formula (A) is a phosphate represented by the following formula (B)

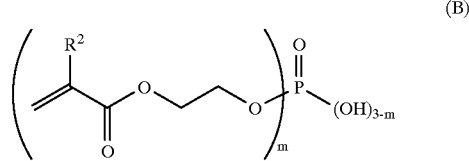
(B)

wherein $R^2$ represents H or $CH_3$, and m is 1 or 2.

4. The flame-retardant thermoplastic composition of claim 1, wherein said thermoplastic resin comprises ABS resin, styrene resin, polyvinyl chloride resin, polyethylene resin, polyvinyl chloride resin, polyethylene resin, polypropylene resin, polyethylene terephthalate resin, polybutylene terephthalate resin, polycarbonate resin, polyphenylene ether resin, modified polyphenylene ether resin, polyamide resin, polysulfone resin, polyvinyl acetate resin and polyacetal resin.

5. The flame-retardant thermoplastic composition of claim 1, wherein said aromatic orthophosphate is a monomeric aromatic orthophosphate selected from the group consisting of triphenyl phosphate, tricresyl phosphate, cresyldiphenyl phosphate, trixylenyl phosphate, xylenyldiphenyl phosphate, tris(t-butyl) phosphate and tris-(isopropylphenyl) phosphate.

6. The flame-retardant thermoplastic composition of claim 1, wherein said aromatic orthophosphate is a polymeric aromatic orthophosphate selected from the group consisting of resorcinol bis(diphenyl phosphate), resorcinol bis (dicresyl phosphate), bisphenol-A bis(dicresyl phosphate) and bisphenol-A bis(dixylenyl phosphate).

7. The flame-retardant thermoplastic composition of claim 1, which further comprises a monoalkyl phosphate or dialkyl phosphate having the formula (C):

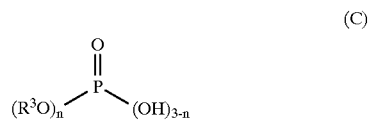
(C)

wherein $R^3$ is linear or branched saturated hydrocarbon group containing from 1 to 30 carbon atoms, and n is 1 or 2.

8. The flame-retardant thermoplastic composition of claim 1, wherein said inorganic filler comprises metal oxides, metal carbonates, metal hydroxides, metal sulfates, talc, kaolin, clay, silica, bentonite, glass, mica, montmorillonite activated clay, carbon block and calcium titanate:

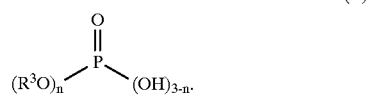
(C)

* * * * *